O. MAYER & E. SCHELLING.
MACHINE FOR DRESSING STONES.
APPLICATION FILED APR. 9, 1912.
1,187,854.
Patented June 20, 1916.
2 SHEETS—SHEET 1.
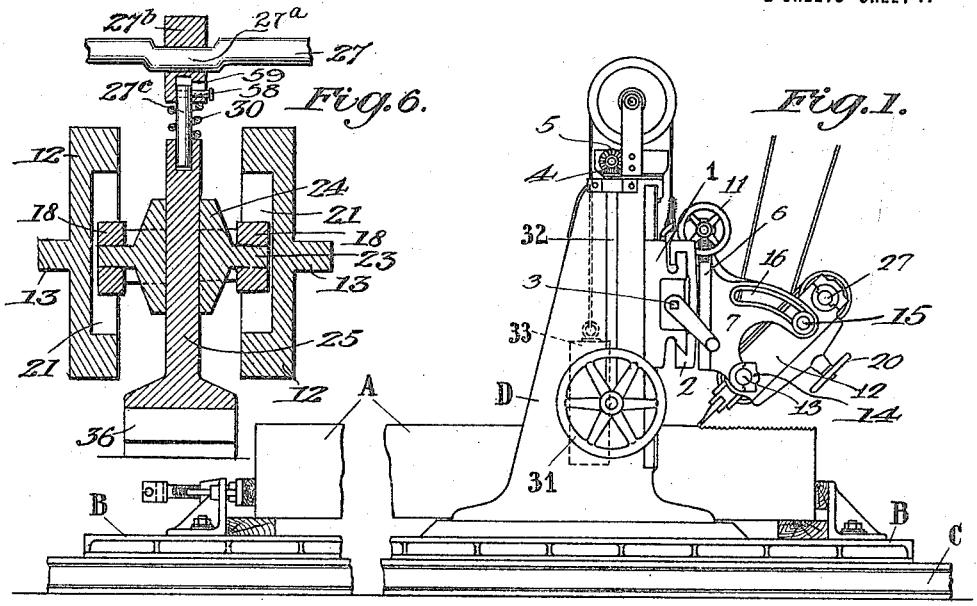
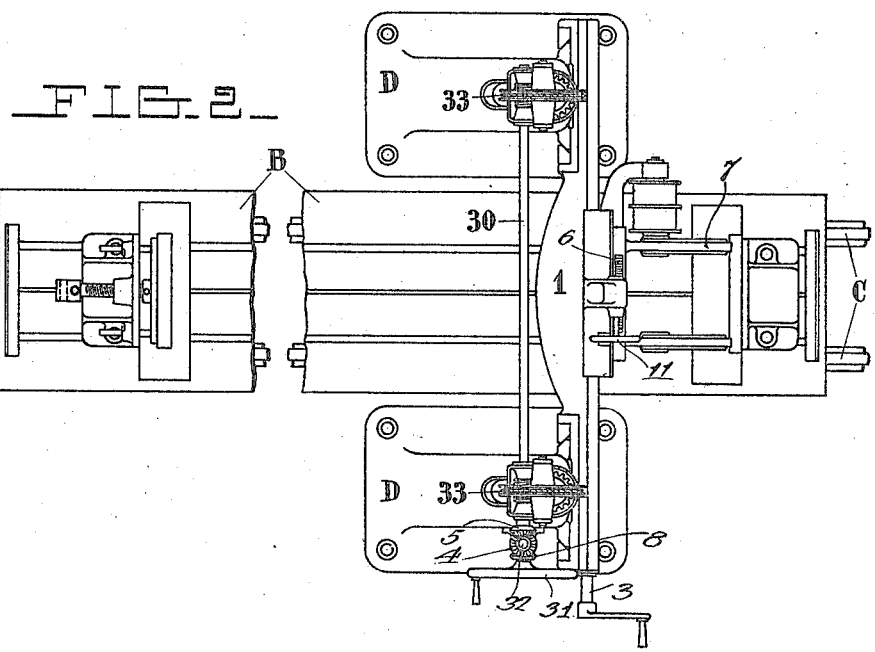

O. MAYER & E. SCHELLING.
MACHINE FOR DRESSING STONES.
APPLICATION FILED APR. 9, 1912.
1,187,854.
Patented June 20, 1916.
2 SHEETS—SHEET 2.
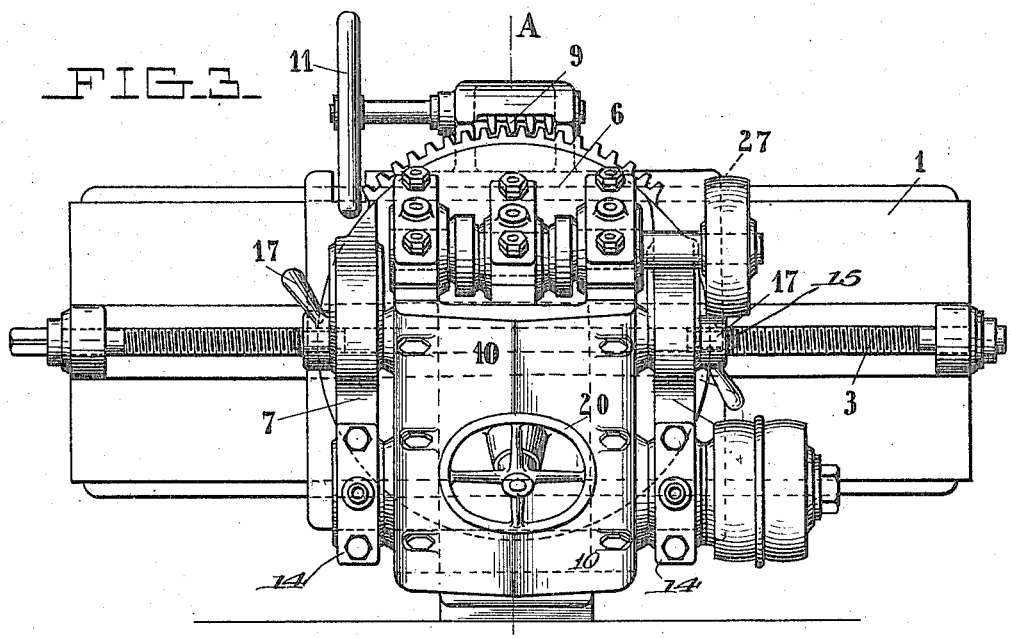
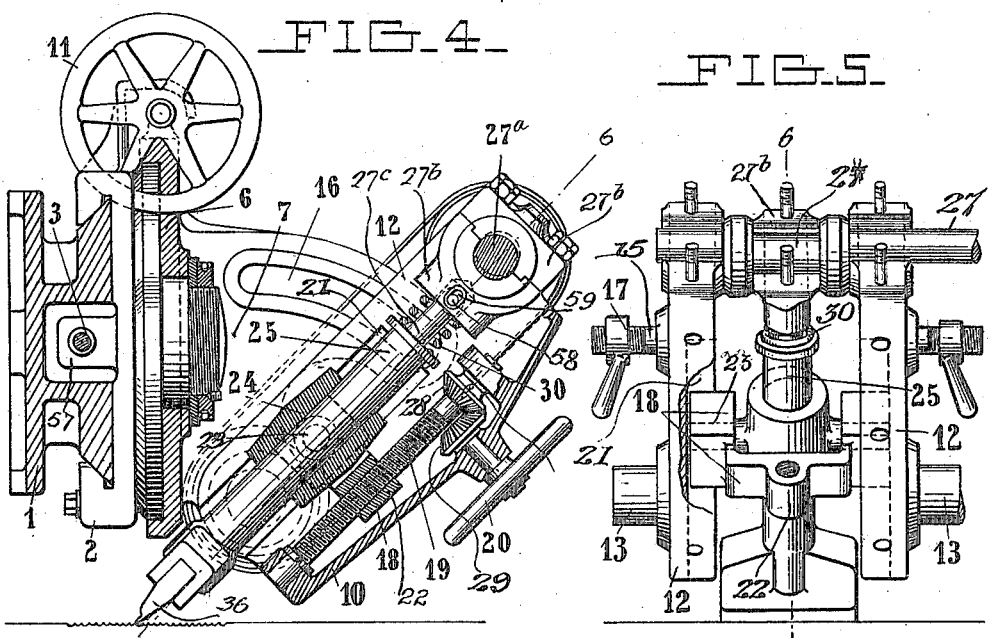

UNITED STATES PATENT OFFICE.

OTTO MAYER, OF BÜRGLEN, AND EDMUND SCHELLING, OF ZURICH, SWITZERLAND.

MACHINE FOR DRESSING STONES.

1,187,854. Specification of Letters Patent. Patented June 20, 1916.

Application filed April 9, 1912. Serial No. 689,642.

*To all whom it may concern:*

Be it known that we, OTTO MAYER, a citizen of the Swiss Confederation, and residing at Bürglen, Canton Thurgau, Switzerland, and EDMUND SCHELLING, a citizen of the Swiss Confederation, residing at Zurich, Switzerland, (whose post-office addresses are Bürglen, Canton Thurgau, Switzerland, and 28 Lindenbachstrasse, Zurich, Switzerland,) have invented new and useful Improvements in Machines for Dressing Stones, of which the following is a specification.

The invention relates to machines for dressing either natural or artificial stones and the object thereof is to provide an improved machine of this class which is simple in construction and operation and the construction of which is such that the machine may be used for different purposes.

The invention is fully disclosed in the following specification of which the accompanying drawing forms a part in which the separate parts of our improvement are designated by suitable reference characters in each of the views, and in which—

Figure 1 is an elevational view showing our improved machine. Fig. 2 is a top view of the machine with the tool holder and work removed. Fig. 3 shows the carriage with the tool holder in a front view. Fig. 4 shows the tool holder in a sectional view on line A—B of Fig. 3. Fig. 5 shows a detail. Fig. 6 is a detail sectional view on the line 6—6 of Fig. 4.

In the drawings A denotes the stone to be worked upon. The stone A is clamped fast on a carriage B running upon rails C. A device (not shown in the drawings) may be provided to give the carriage automatically a reciprocating motion. The arrangement is similar to that of a planing machine. On both sides of the rails C a standard D is fixed on which a crossguide 1 is slidably mounted. The cross guide 1 is moved up and down in the well known manner by means of two vertical screws each of which is provided with a bevel gear 4, the bevel gears of the vertical screws are in mesh with bevel gears 5 fixed on a horizontal shaft 30. The shaft 30 may be rotated by a hand wheel 31 driving a vertical shaft 32 by means of bevel gears 8. To insure an easy vertical adjustment the cross guide 1 is connected with two counterweights 33 by means of two steel wire ropes running over pulleys fixed to the standards D. On the cross guide 1 a tool rest 2 is slidably mounted which can be moved along the cross guide by a nut 57 and screw 3. On the tool rest a circular disk 6 is rotatably mounted on a pivot fixed to the tool rest. The disk 6 has worm teeth on its upper edge forming a portion of a worm wheel the teeth being cut away on the larger part of the circumference. A worm 9 rotatably mounted in the tool rest meshes with the teeth on the disk 6. The worm 9 may be rotated by a hand wheel 11. On the disk 6 there are two parallel walls 7 between which the tool support 12 is rotatably mounted by means of two trunnions 13 resting in bearings 14 in the walls 7. On the tool support 12 two bolts 15 are fixed projecting with their screw threaded ends through slots 16 in the wall 7. On each of the bolts a nut 17 with a handle is arranged by means of which the tool support may be fixed at any angle with reference to the stone A. A shaft 27 is journaled in the tool support which is provided with an eccentric 27$^a$. On the eccentric 27$^a$ a head 27$^b$ is arranged having a bore for receiving a bolt 27$^c$ which is fixed to tool holder 25 and slidably arranged in the bore in the head 27$^b$. Between the tool holder and the head we arrange a spring 30.

The tool holder 25 carries a bit 36 and is slidably mounted in a sleeve 24 rotatably mounted in a yoke 18 by means of trunnions 23. The trunnions 23 of the sleeve 24 pivot in the arms of the yoke 18 and these arms are provided with integral lugs sliding in slots 21 in the tool support 12. The stem 22 of the yoke 18 forms a nut for the screw threaded spindle 19 which is rotatably mounted in the tool support 12 and carries a bevel wheel 28 meshing with a bevel gear 29 secured to the hand wheel 20, whereby the yoke 18 is moved longitudinally with respect to the tool support 12 by operating the hand wheel 20.

The machine is used as follows: After the stone A is placed in position, the shaft 27 is rotated whereby the tool holder 25 is reciprocated in its axial direction simultaneously swung about its pivots 23. The path of the cutting edge of the bit is an ellipse the size of which may be altered by shifting the yoke 18 with reference to the eccentric 27$^a$ in the manner described above. The stone A is now fed below the bit which cuts regular rows of grooves in the stone if the latter is advanced with a regular speed. If other than the horizontal face of a stone is to be worked upon, the disk 6 is turned to the desired angle. The spring 30 serves to cushion the strokes. The tool holder is prevented from slipping down out of the correct relative position with respect to the head 27ᵇ by means of a bolt 58 fastened to the upper end of the bolt 27ᶜ, the bolt 58 extending through a slot 59 in the head 27ᵇ and lying at right angles to the bolt 27ᶜ. The cutting edge of the bit may be straight or may be curved in such a manner that the grooves formed by the bit may have any desired shape in cross section.

We have described herein the preferred form of apparatus embodying our invention, but we wish it understood that various details of construction may be changed without departing from the spirit of our invention.

We claim:

1. A machine for dressing stones comprising a carriage carrying the stone to be worked upon, an adjustable tool support, a sleeve adjustably mounted in said tool support, a tool holder slidably mounted in said sleeve, means to shift said sleeve in the tool support, an eccentric rotatably mounted in the tool support, and means for rotating said eccentric.

2. A machine for dressing stones comprising a carriage for the stone to be worked upon, a cross guide adjustable in vertical direction, a tool rest slidably mounted on said cross guide, a pivot on said tool rest, a disk rotatably mounted on said pivot, means to rotate said disk, a tool support adjustable on said disk, a sleeve adjustably mounted in said tool support, a tool holder slidably mounted in said sleeve, means to shift said sleeve in the tool support, an eccentric rotatably mounted in the tool support, and means for rotating said eccentric.

In testimony whereof we affix our signatures in presence of two witnesses.

OTTO MAYER.
EDMUND SCHELLING.

Witnesses:
CARL GUBLER,
AUGUST RÜEGG.

Copies of this patent may be obtained for five cents each, by addressing the "Commissioner of Patents, Washington, D. C."